United States Patent [19]
Schaible et al.

[11] Patent Number: 5,775,766
[45] Date of Patent: Jul. 7, 1998

[54] CONVERTIBLE HARDTOP VEHICLE

[75] Inventors: Kurt Schaible; Holger Seel, both of Aidlingen; Bernahrd Schenk, Böblingen, all of Germany

[73] Assignee: Mercedes-Benz AG, Stuttgart, Germany

[21] Appl. No.: 647,316

[22] Filed: May 9, 1996

[30] Foreign Application Priority Data

May 9, 1995 [DE] Germany .................. 195 16 877.1

[51] Int. Cl.[6] ............................................... B62D 25/06
[52] U.S. Cl. ........................................................ 296/107
[58] Field of Search .................................. 296/107, 116, 296/121

[56] References Cited

U.S. PATENT DOCUMENTS 1,649,607  11/1927  Marshall .
3,180,677   4/1965  Scott ............................ 296/107
5,033,789   7/1991  Hayashi et al. .

FOREIGN PATENT DOCUMENTS 2 383 059   10/1978  France .
2 687 359    8/1993  France .
4010276C2   10/1990  Germany .
A492425      8/1992  Japan .
5-169978     7/1993  Japan .
2 257 667A   1/1993  United Kingdom .

OTHER PUBLICATIONS

Search Report dated Jul. 9, 1996, Great Britain.
Search Report dated Sep. 27, 1996, France.

*Primary Examiner*—Jesus D. Sotelo
*Attorney, Agent, or Firm*—Evenson McKeown Edwards & Lenahan, PLLC

[57] ABSTRACT

A hardtop vehicle is provided with a roof construction having a forward roof part and a rear window part, which roof construction can be swivelled from a closing position resting against the area of a forward windshield frame into an opening position toward the rear area of the vehicle body, placed in a top compartment and this top compartment can be covered by means of a swivellable rear opening device. On the rear opening device, an auxiliary frame is provided which can be moved around a pivot bearing fixed to the body and which, when the rear opening device is closed, is supported on the vehicle body by at least one additional supporting connection.

16 Claims, 4 Drawing Sheets

CONVERTIBLE HARDTOP VEHICLE

BACKGROUND AND SUMMARY OF THE INVENTION

This invention relates to a hardtop vehicle having a two-part roof construction which can be lowered below a rear opening into a top compartment in the rear area of the vehicle.

In the case of known hardtop vehicles with a swivellable roof construction (German Patent Document DE 40 10 276 C2), a trunk lid and a top compartment lid are provided in the rear area, in which case these two lids, by way of respective pivot bearings supported on the vehicle body, can be swivelled into an opening position. The folded-together or folded roof parts, after a corresponding opening movement of the top compartment lid, can be swivelled into a top compartment in the rear area of the vehicle or can be swivelled out of it. During each usage, the hardtop vehicle is covered in the rear area of its body by means of the lid components, in which case their construction as subassemblies pivotally connected only in the pivot bearings on the body side offers a disadvantageously low protection against deformation, for example, in the case of collisions.

It is an object of the invention to provide a hardtop vehicle whose constructive design in the rear area permits an improvement of the crash safety at low technical expenditures.

The invention achieves this object by means of a roof construction which has a forward roof part and a rear window part and which can be swivelled from a closed position resting against an area of a forward windshield frame into an opening position toward a rear area of the vehicle body in a top compartment, said top compartment being coverable by a swivellable rear opening device, wherein an auxiliary frame is provided on the rear opening device, said auxiliary frame being movable about pivot bearings fixed to the body, and wherein the auxiliary frame is supported by way of at least one additional supporting connection on the vehicle body when the rear opening device is closed.

The invention provides a hardtop vehicle whose particularly one-piece rear opening device with the auxiliary frame supported on the rear side on the vehicle body and with the additional supporting connection provided from the auxiliary frame to the vehicle body forms a compact rear subassembly in such a manner that, when the roof construction is in the closed position as well as in the open position and when the rear opening device is closed, an improvement of the crash stability in the rear area of the vehicle is possible at low technical expenditures.

In the case of a conceivable collision with the hardtop vehicle, when the rear opening device is closed, its rear area is protected better because of the fact that this rear opening device is supported on the vehicle body by way of the auxiliary frame with the supporting connection and simultaneously by way of the pivot bearings arranged in the lower vehicle end area, by means of which forces acting in the rear area during a collision are absorbed by way of the auxiliary frame in a first damping phase and only subsequently, by way of the connecting areas formed by the supporting connection as well as by the pivot bearings, a residual introduction of force into the whole vehicle body takes place. Thus, while the protection of the occupants situated in the rear area is improved, at the same time, a stabilization of the whole rear area is achieved in the manner of a rear-side deformation zone.

Other objects, advantages and novel features of the present invention will become apparent from the following detailed description of the invention when considered in conjunction with the accompanying drawings.

DETAILED DESCRIPTION OF THE DRAWINGS

Figure 1:
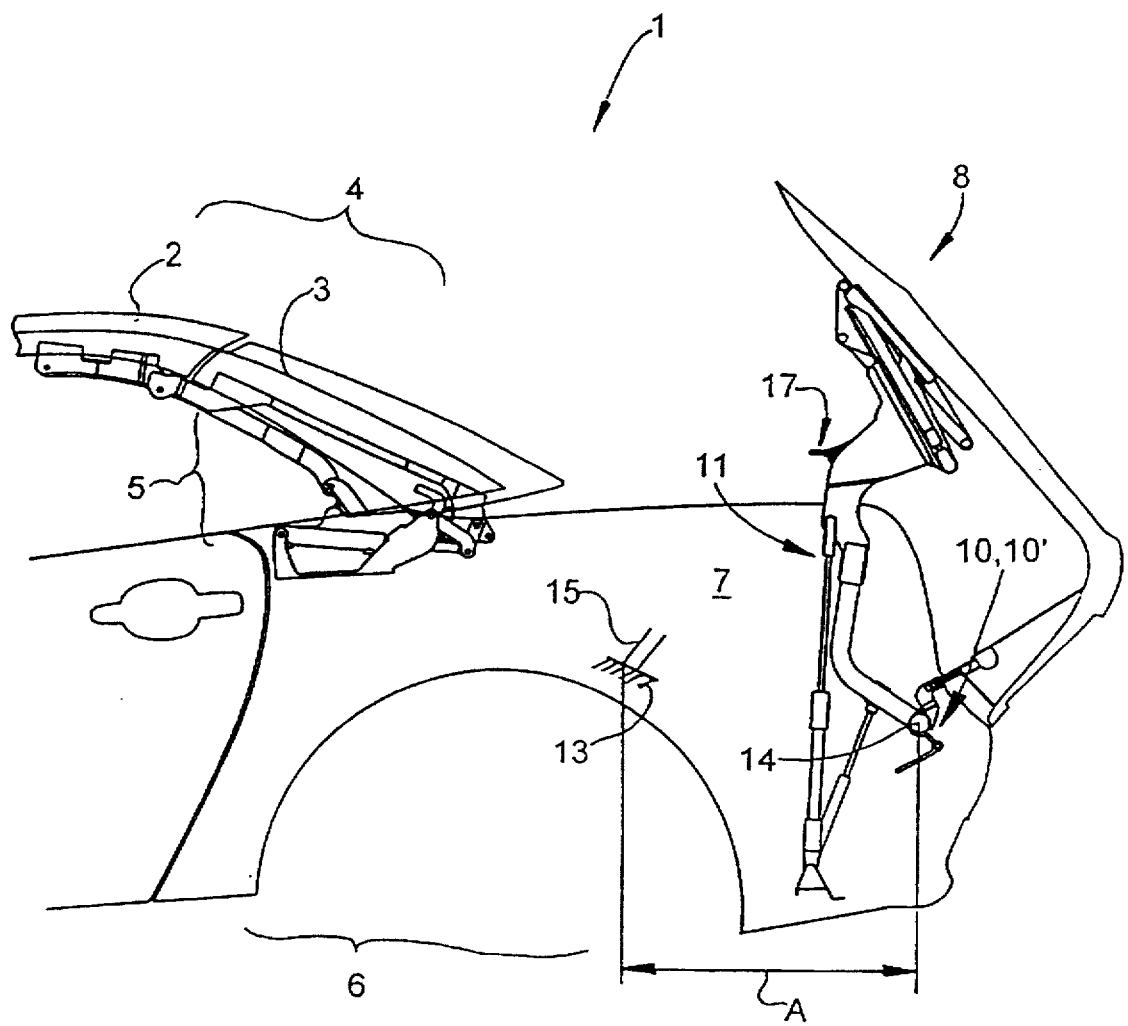
FIG. 1 is a partial sectional lateral schematic view of a hardtop vehicle in its rear area with a rear opening device which is opened up for the swivelling-in or swivelling-out of the roof structure constructed according to a preferred embodiment of the invention.

FIG. 1 illustrates a hardtop vehicle which, as a whole, has the reference number 1 and whose roof construction having a forward roof part 2 and a rear window part 3 is shown in a closed position resting against the forward windshield frame (not shown). From this closed position, the roof construction 4 can be swivelled under the effect of positive control elements supported on the body side into an opening position toward the rear area 6 of the vehicle and can be deposited in a top compartment 7.

Figure 2:
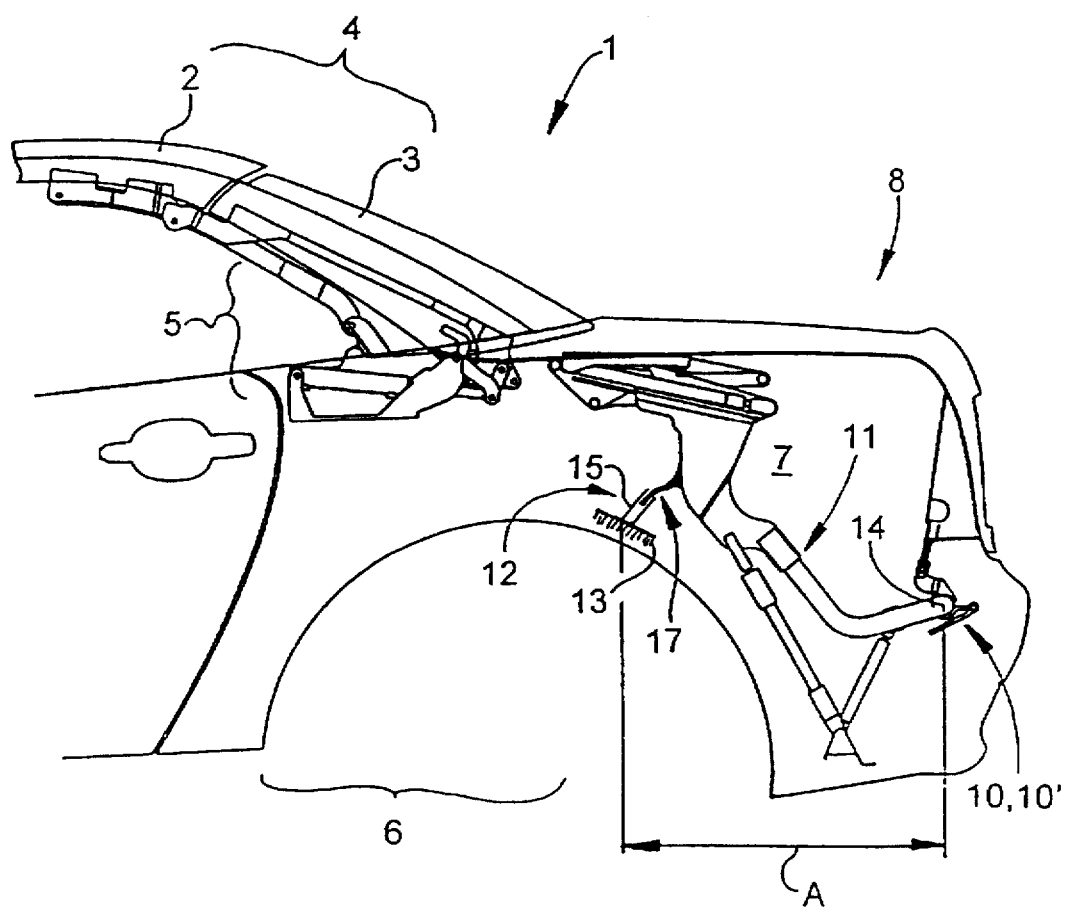
FIG. 2 is a lateral view similar to FIG. 1, showing the rear opening device in the closed position.

In the opened driving condition of the vehicle (not shown) as well as in the closed driving condition of the vehicle illustrated in FIG. 2, the top compartment 7 is closed by way of a rear opening device 8. In this case, in the area of respective body-fixed pivot bearings 10 and 10' (10' not visible in the drawings) which are in each case provided on both sides of the longitudinal axis 20 (FIG. 3) of the vehicle, the rear opening device according to the invention is swivellably supported by way of an auxiliary frame 11. In the closed position of the rear opening device 8 (FIG. 2), the auxiliary frame 11 is fixed on the vehicle body 13, for example, in the area of the wheel house, by way of at least one additional supporting connection, in general, having the reference number 12.

The supporting connection 12 is arranged at a distance A to the swivel axis 14 of the rear opening device 8 defined by the pivot bearings 10, 10'. By means of supporting connection 12 and using a very simple construction of the components, the assigned auxiliary frame 11 can be fixed directly by way of a receiving part 15 on the vehicle body in a crash-stable connection position (not shown) in the closed position of the rear opening device 8.

Figure 3:
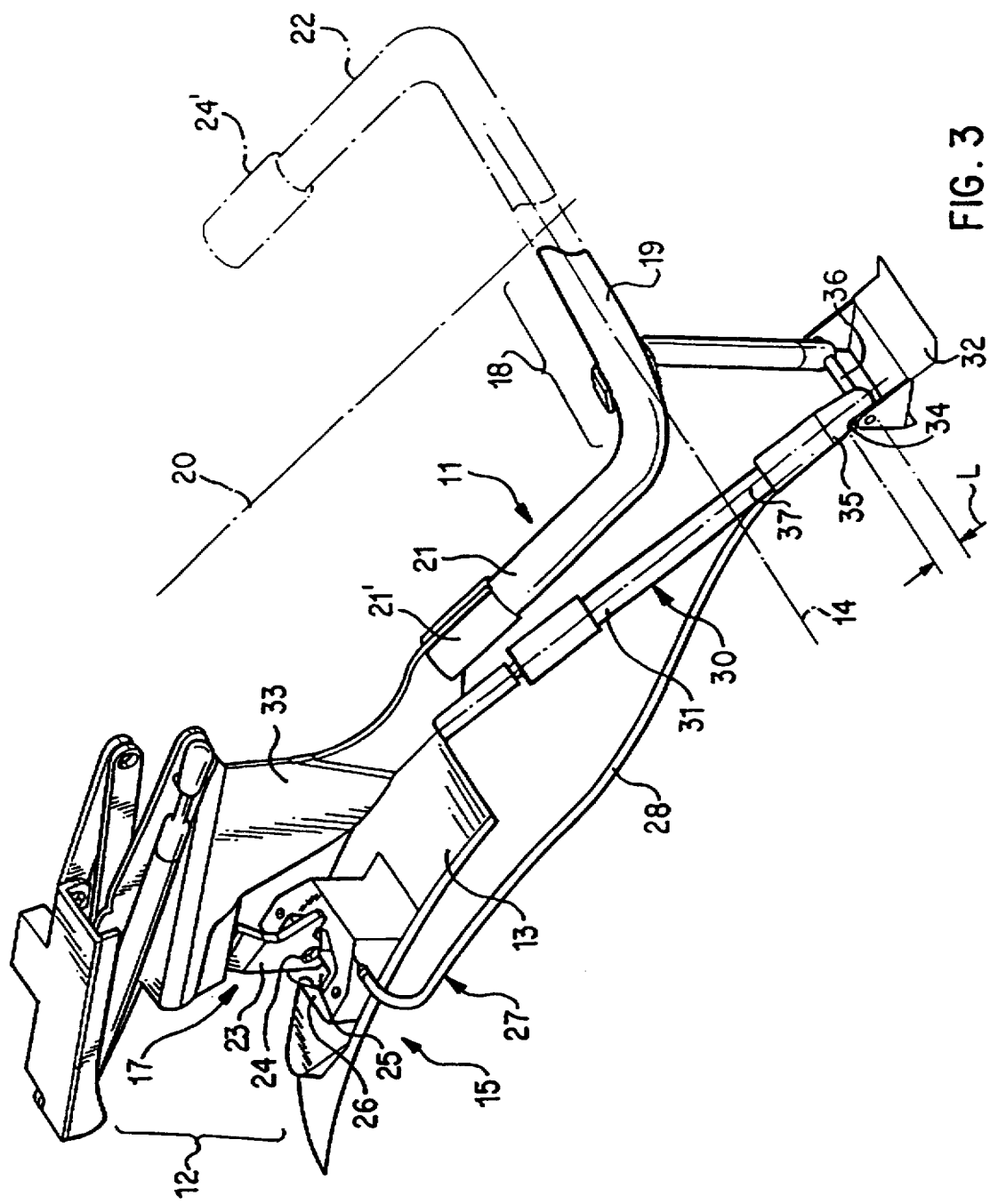
FIG. 3 is an enlarged representation of a detail of an auxiliary frame supporting the rear opening device with a body-side supporting connection.

In the preferred illustrated construction, the supporting connection 12 is in each case formed by a pin part 17 which engages in a force-locking and/or form-locking manner in the receiving part 15 (FIG. 3). In a preferred contemplated simple construction, this pin part 17 is constructed as a cone which engages into a body-side bush forming the receiving part 15 in such a manner that, by way of a form-locking connecting engagement of the components, the additional supporting connection 12 is achieved.

In the embodiment of the hardtop vehicle 1 illustrated in detail in FIG. 3, the auxiliary frame 11 is constructed as a U-shaped curved supporting tube 18 whose base leg 19 is arranged perpendicularly to the longitudinal axis 20 of the vehicle and on whose free legs 21 and 22 (only schematically depicted) one supporting connection 12 respectively is provided. In preferred embodiments the supporting connections 12 are similar and symmetric with respect to the longitudinal axis 28 of the vehicle, therefore only one side is depicted in the drawing figures.

Figure 4:
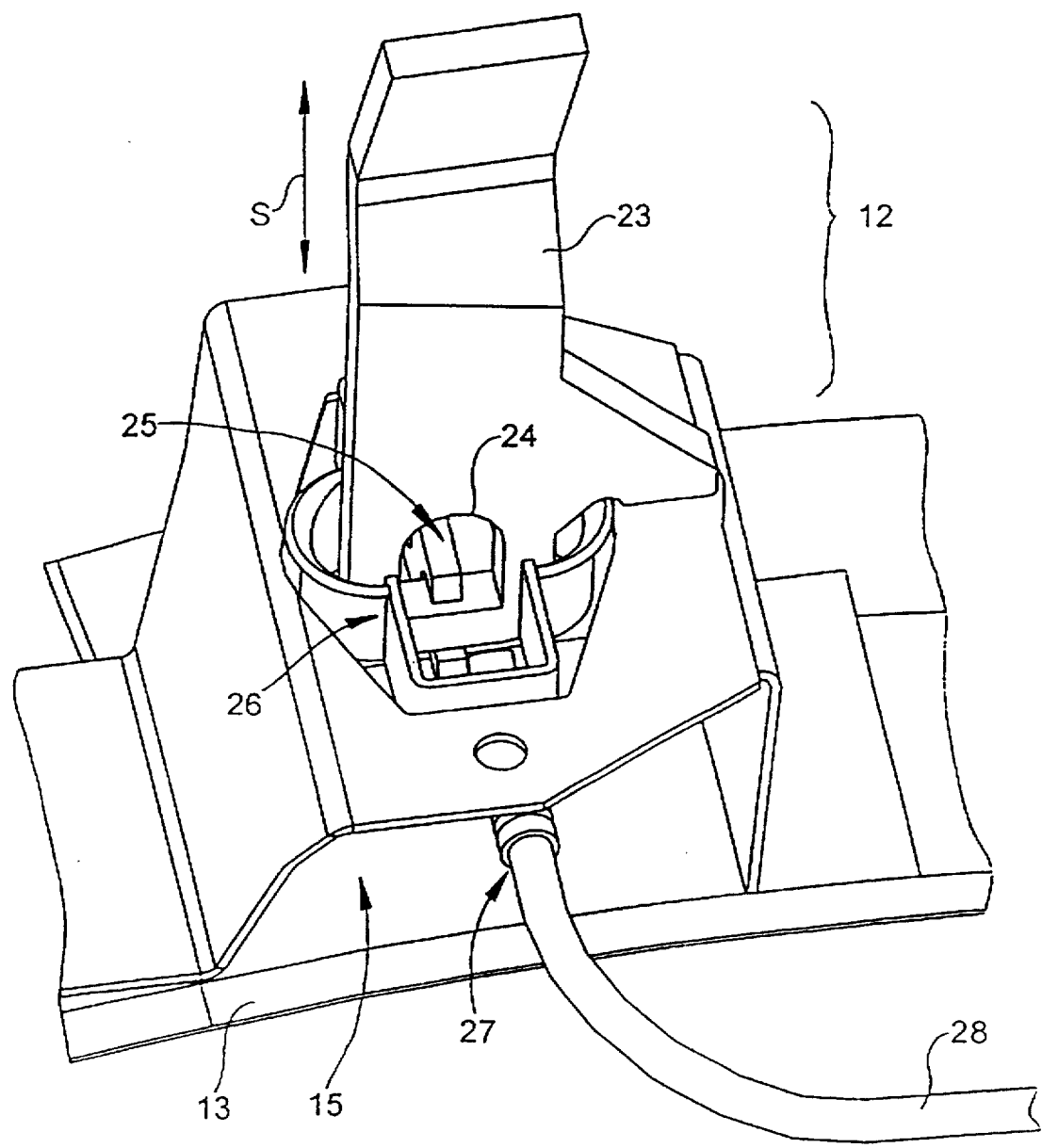
FIG. 4 is a partial sectional view of a detail of the supporting connection.

In the illustrated preferred embodiment, the pin part 17 situated on the respective free legs 21 of the auxiliary frame 12 is formed by a key collar 23 which, in the closed position (FIG. 4), engages by means of a connection profile 24 in an automatically lockable or unlockable counterhold 25 in the receiving part 15 constructed as a lock 26.

In this case, the counterhold 25 is connected with a spring member (not shown) which is prestressable by way of the entering movement (arrow S) of the key collar 23 by means of which spring element the key collar 23 is held in a stationary manner in the lock 26. A pull part 27 is also applied to the lock 26, by means of which pull part 27 the counterhold 25 or the prestressed spring element can be moved in such a manner that the key collar 23 preventing an unintentional movement of the pin part 17 can be moved into a release position when the rear opening device 8 is brought into the opening position (FIG. 1).

In the illustrated embodiment, the pull part 27 is formed by a Bowden pull 28 by way of which the counterhold 25 situated in the receiving part 15 is connected with a driving element 30 moving the rear opening device 8 and the auxiliary frame 11.

In an expedient embodiment, a hydraulic cylinder 31 is provided as the driving element 30, which hydraulic cylinder 31 is connected with the leg 21 of the auxiliary frame 11 on the one side and, on the other side is connected, in the area of a bearing block 32 is supported on the vehicle body. For moving the rear opening device 8 or the auxiliary frame 11, respective hydraulic cylinders 31 are provided on this auxiliary frame 11 in the area of both legs 21 and 22, in which case the hydraulic cylinders 31 are connected by way of a holding plate 33 with the respective leg ends 21', 22'.

In the area of the respective bearing block 32, the hydraulic cylinder 31, by way of a supporting member 35 having an oblong hole 34, is supported in such a manner in the area of the holding strut 36 on the bearing block 32 that a movement is possible in the direction of a cylinder axis 37.

By means of this support of the hydraulic cylinder 31 in the area of the oblong hole 34, an unlocking is possible at low expenditures in the area of the lock 26. By way of the oblong hole 34, the hydraulic cylinder 31 which is pressurized in the closed condition receives a dead movement, for example, of approximately 13 mm, which causes a displacement of the point of rotation of the hydraulic cylinder 31 during the opening of the rear opening device 8 for the depositing or for the opening of the roof construction 4 (FIG. 2). During the opening operation, the point of rotation of the hydraulic cylinder 31 is situated in the upper area of the oblong hole 34 and, in the first movement phase, causes a control of the Bowden pull 28 by way of a deflection element (not visible) situated on the hydraulic cylinder 31 in the area of the lower supporting member 35, whereby the unlocking of the key collar 23 in the lock 26 is achieved.

By means of this axial displacement by a length L within the oblong hole 34, by means of constructively simple devices, a movement of the Bowden pull 28 is permitted and thus, in the area of the lock 34, the counterhold 25 is reliably unlocked before the swivelling of the rear opening device 8.

In the area of the supporting connection 12, between the components to be locked, an elastic supporting part, such as an elastomer ring, may be provided by means of which vibrations occurring during the driving movement of the vehicle 1 in the area of the rear components can be damped at low expenditures in such a manner that, also in the case of high dynamic loads, the rear opening device 8 can be connected in a noiseless closing position with the vehicle body components.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Hardtop vehicle having a roof construction which has a forward roof part and a rear window part and which can be swivelled from a closed position resting against an area of a forward windshield frame into an opening position toward a rear area of the vehicle body in a top compartment, said top compartment being coverable by a swivellable rear opening device, wherein an auxiliary frame is provided on the rear opening device, said auxiliary frame being movable about pivot bearings fixed to the body, and wherein the auxiliary frame is supported by way of at least one additional supporting connection in a crash-stable connecting position on the vehicle body when the rear opening device is closed.

2. Hardtop vehicle having a roof construction which has a forward roof part and a rear window part and which can be swivelled from a closed position resting against an area of a forward windshield frame into an opening position toward a rear area of the vehicle body in a top compartment, said top compartment being coverable by a swivellable rear opening device, wherein an auxiliary frame is provided on the rear opening device, said auxiliary frame being movable about pivot bearings fixed to the body, wherein the auxiliary frame is supported by way of at least one additional supporting connection on the vehicle body when the rear opening device is closed, wherein the supporting connection is arranged at a distance from a swivel axis of the rear opening device defined by the pivot bearings, and wherein the auxiliary frame is fixed directly by way of a receiving part in a crash-stable connecting position in the closed position of the rear opening device.

3. Hardtop vehicle according to claim 2, wherein one pin part respectively engaging in one of a force-locking and form-locking manner in the receiving part is provided as the supporting connection.

4. Hardtop vehicle according to claim 3, wherein the pin part is constructed as a cone and this cone engages in a body-side bush forming the receiving part.

5. Hardtop vehicle according to claim 4, wherein the auxiliary frame is constructed as a supporting tube curved in a U-shape whose base leg is arranged perpendicularly to a longitudinal axis of the vehicle and on whose free legs a respective supporting connection is provided.

6. Hardtop vehicle according to claim 3, wherein the auxiliary frame is constructed as a supporting tube curved in a U-shape whose base leg is arranged perpendicularly to a longitudinal axis of the vehicle and on whose free legs a respective supporting connection is provided.

7. Hardtop vehicle according to claim 6, wherein pin parts are situated on the respective free legs of the auxiliary frame and are formed by a respective key collar which, in a closed position of the rear opening device, engages by means of a connection profile in an automatically lockable and unlockable counterhold in the receiving part constructed as a lock.

8. Hardtop vehicle according to claim 7, wherein the counterhold is provided with a spring member which is prestressable by way of the entering movement of the key collar and this spring member can be unlocked by way of a pull part.

9. Hardtop vehicle according to claim 6, wherein a counterhold situated in the receiving part is connected with a driving element moving the rear opening device by way of the pull part formed by a Bowden pull.

10. Hardtop vehicle according claim 9, wherein the driving element for the rear opening device is formed by a hydraulic cylinder which, on the one side, is connected with one of the legs of the auxiliary frame and, on the other side, is supported in an area of a bearing block on the vehicle body.

11. Hardtop vehicle according to claim 10, wherein the hydraulic cylinder in the area of the respective bearing block is supported by way of a supporting member having an oblong hole.

12. Hardtop vehicle according to claim 11, wherein the Bowden pull which is applied on one side to the receiving part is connected in the area of the supporting member with the respective hydraulic cylinder.

13. Hardtop vehicle according to claim 9, wherein the auxiliary frame in the area of both legs is provided with a hydraulic cylinder and this hydraulic cylinder is connected with the legs in each case by way of a holding plate.

14. Hardtop vehicle according to claim 13, wherein the hydraulic cylinder in the area of the respective bearing block is supported by way of a supporting member having an oblong hole.

15. Hardtop vehicle according to claim 14, wherein the Bowden pull which is applied on one side to the receiving part is connected in the area of the supporting member with the respective hydraulic cylinder.

16. Hardtop vehicle having a roof construction which has a forward roof part and a rear window part and which can be swivelled from a closed position resting against an area of a forward windshield frame into an opening position toward a rear area of the vehicle body in a top compartment, said top compartment being coverable by a swivellable rear opening device, wherein an auxiliary frame is provided on the rear opening device, said auxiliary frame being movable about pivot bearings fixed to the body, wherein the auxiliary frame is supported by way of at least one additional supporting connection on the vehicle body when the rear opening device is closed, and wherein the auxiliary frame is constructed as a supporting tube curved in a U-shape whose base leg is arranged perpendicularly to a longitudinal axis of the vehicle and on whose free legs a respective supporting connection is provided.

* * * * *